United States Patent [19]

Schneider et al.

[11] Patent Number: 4,604,100

[45] Date of Patent: Aug. 5, 1986

[54] PROCESS FOR THE PREPARATION OF GRANULAR DYE FORMULATIONS FROM POLYETHYLENE GLYCOL MELT

[75] Inventors: Dieter Schneider; Heinz Knies, both of Grenzach-Wyhlen; Gerhard Kaudela, Fischingen, all of Fed. Rep. of Germany

[73] Assignee: Ciba-Geigy Corporation, Ardsley, N.Y.

[21] Appl. No.: 710,785

[22] Filed: Mar. 11, 1985

[30] Foreign Application Priority Data

Mar. 15, 1984 [CH] Switzerland ............ 1289/84

[51] Int. Cl.$^4$ .................. B01J 2/28; C09B 67/42
[52] U.S. Cl. ........................... 8/526; 8/524; 8/609; 8/611; 8/648; 8/650; 8/662; 8/675; 8/685; 8/924; 8/654; 8/657
[58] Field of Search ............................ 8/526

[56] References Cited

U.S. PATENT DOCUMENTS 3,948,599 4/1976 Irmiger et al. .................. 8/526
4,425,134 1/1984 Bruttel et al. .................. 8/524
4,525,170 6/1985 Balliello ....................... 8/524

FOREIGN PATENT DOCUMENTS 1509965 5/1978 United Kingdom .
1518996 7/1978 United Kingdom .

*Primary Examiner*—A. Lionel Clingman
*Attorney, Agent, or Firm*—Edward McC. Roberts; Meredith C. Findlay; Irving M. Fishman

[57] ABSTRACT

The invention describes a process for the preparation of granular dye formulations by melt granulation, using a polyethylene glycol as melt vehicle. The essential feature of the invention is that a start is made from the dye which contains water, for example from the aqueous filter cake or synthesis solution, and adjusting the moisture content of the granular formulations to 1 to 30% by partial evaporation of water from the dye/polyethylene glycol melt.

17 Claims, No Drawings

PROCESS FOR THE PREPARATION OF GRANULAR DYE FORMULATIONS FROM POLYETHYLENE GLYCOL MELT

The present invention relates to a process for the preparation of granular dye formulations, to the formulations obtained by said process, and to the use thereof for the preparation of dye baths, padding liquors or printing pastes for dyeing or printing textile material.

Compared with commercially available powder formulations, granular formulations have a number of advantages. For example, they are virtually non-dusting, they have a high bulk density, they do not form lumps during storage, and they are still free-flowing after years. Because of these advantages, granulating methods have meanwhile also found wide application in the art of dye formulation. Examples of important granulating methods are spray granulation, build-up granulation, and also melt granulation. Melt granulation in particular is simple to perform and does not require complicated apparatus.

Characteristic of melt granulation is that the dye is suspended or dissolved at elevated temperature in a fused carrier material, the "melt vehicle", and the melt is granulated during or after solidification. The melt vehicles employed are normally compounds which are readily soluble in water and have a melting point of about 40° to 200° C. Examples are urea (DE-OS 1 619 375 and 2 322 308), urea derivatives, sulfones, lactams, sugars or polyalcohols (DE-OS 2 529 564), and also ethylene oxide adducts or polyethylene glycols (DE-OS 2 529 569).

This last mentioned patent publication describes, inter alia, the melt granulation of cationic dyes using polyethylene glycol as melt vehicle. However, this known prior art process employs in principle a dry dye powder as starting material, i.e. the dye must be isolated from an aqueous solution or suspension after the synthesis and dried. This mode of preparation, however, is laborious and requires a high energy consumption. In addition, it frequently happens that dyes form lumps when being dried and subsequently have to be ground. Finally, some cationic dyes cannot be isolated in solid form and are obtained as an aqueous oil.

These has now been found a novel process that reduces costs and improves quality and, surprisingly, which also permits the granulation of dyes having a more or less high water content, using polyethylene glycol as melt vehicle. In this process, it is necessary only to remove some of the water, even where the dye has a high water content, as the granular formulations so obtained may contain up to 30% by weight of water and still have very good use properties.

Accordingly, the present invention relates to a process for the preparation of granular dye formulations by melt granulation, using polyethylene glycol as melt vehicle, which process comprises using dyes which contain water, and adjusting the moisture content of said granular formulations to 1 to 30% by weight by partial evaporation of the water from the dye/polyethylene glycol melt.

Suitable dyes, by which are also meant fluorescent whitening agents, are in particular water-soluble dyes, for example acid dyes such as nitro, aminoketone, ketone-imine, methine, nitro, diphenylamine, quinoline, aminonaphthoquinone or coumarin dyes, and, most particularly, anthraquinone dyes and azo dyes such as monoazo and disazo dyes.

These dyes contain at least one anionic water-solubilising group, for example a carboxylic acid group or, in particular, a sulfonic acid group, and are usually in the form of a salt, for example the lithium, sodium, potassium or ammonium salt.

The process of this invention is particularly suitable for granulating water-soluble cationic dyes and fluorescent whitening agents which may belong to a very wide range of chemical classes.

The dyes in question are salts such as chlorides, sulfates, methosulfates or onium chlorides or metal halides, for example tetrachlorozincate salts of azo dyes such as monoazo, disazo and polyazo dyes; and anthraquinone dyes, phthalocyanine dyes, diarylmethane and triarylmethane dyes; methine, polymethine and azomethine dyes; thiazole dyes, ketone-imine, acridine, cyanine, nitro, quinoline, benzimidazole, xanthene, azine, oxazine, thiazine and triazene dyes which carry at least one quaternary nitrogen atom in the molecule.

In principle, it is also possible to granulate by the process of this invention water-insoluble or sparingly water-soluble dyes, for example disperse dyes, vat dyes, sulfur dyes or metal complex dyes.

It is preferred to use dyes having a water-content of 5% by weight and above, preferably in the form of the aqueous filter cake, of the synthesis solution or suspension, of the synthesis melt, or of an aqueous oil. As excess water can be readily distilled off by heating the polyethylene glycol melt, after addition of the dye, to temperatures above 100° C. (or in the range from 50° to 100° C. in vacuo), it is possible to process even dilute aqueous solutions having a dye content of about 10% by weight. In general, the water content of the dyes is in the range from 10 to 90% by weight. Preferably, however, a start will be made from dyes that contain not more than 50% by weight of water. Most preferably, dyes having a water content in the range from 10 to 50% by weight will be processed according to the process of this invention.

In addition, the viscosity of the polyethylene glycol/dye melt can be controlled by the water content. The higher the water content of the melt, the lower the viscosity of the melt. The desired viscosity of the melt, measured at 80° C., is in the range from 100 to 5000 mPa·s. A melt having such a consistency can be atomised without difficulty or tabletted with the aid of a rotating perforated metal cylinder.

The polyethylene glycol employed as melt vehicle preferably has a molecular weight in the range from 1000 to 40,000, most preferably of 1500 to 20,000. Such polyethylene glycols melt in the range from 40° to 60° C. It will be clearly understood that, when using temperature-sensitive dyes, the melting point of the polyethylene glycol employed must be below the decomposition temperature of the dye to be granulated.

It is an essential feature of the invention that stable granules are obtained with relatively little polyethylene glycol. In particular, when using low melting cationic dyes, less than 20% by weight of polyethylene glycol suffices in some cases, based on the dye. It is advantageous to use 0.1 to 2 parts, preferably 0.2 to 1.5 parts, of polyethylene glycol per 1 part of dye.

Conventional auxiliaries can also be added to the polyethylene glycol/dye melt. Suitable auxiliaries are for example those that improve the water solubility, the solubility rate and the stability of the granules, and are for example lactams and amides, e.g. ε-caprolactam, nicotinamide and methacrylamide; or those for adjusting the optimum pH value of the dye melt, for example organic acids that are solid at room temperature such as p-toluenesulfonic acid, maleic acid and monochloroacetic acid; or those that improve the solid granular formulation, for example highly disperse silica, aluminium oxides or mixed oxides; or also the conventional extenders such as Glauber's salt or lignosulfonate, in order to bring the tinctorial strength of the ready-for-use granular formulation to a predetermined value.

Depending on the dye, the addition of auxiliaries is advantageous for obtaining a homogeneous polyethylene glycol/dye melt. In this connection, ethylene glycol and dextrin are particularly useful solubilisers, whilst glycerol is effective if it is desired to counteract phase separation when distilling off water.

As mentioned at the outset, the moisture content of the granular formulations may be up to 30% by weight without any sensation of moisture or risk of caking during storage. Depending on the dye, the residual moisture content of the granular formulations is normally in the region of 5 to 25% by weight.

The term "granular formulation" shall be understood throughout this specification as meaning, in addition to spherical and drop-shaped structures, also tablets and chips as well as flakes and pellets, depending on the form in which the polyethylene glycol/dye melt is solidified. It will, of course, be understood that the melt—which can be poured onto a cooling tray—can also be comminuted mechanically to a specific granular form after cooling. A further method of granulating consists in spraying the polyethylene glycol/dye melt in a cooling tower (prilling).

The granulating process of this invention is carried out, for example, as follows. Polyethylene glycol having a molecular weight of about 20,000 is melted and the melt is then dissolved, in the temperature range from 100° to 150° C., in the corresponding amount of dye filter cake (water content about 30 to 50% by weight). With efficient stirring, the melt is homogenised and a portion of the water is evaporated off. To produce granules in tablet form, the melt is then forced through a perforated rotating cylinder and dropped onto a cooling belt. The finished granules are then collected in a container at the end of the cooling belt. An appropriate granulating machine is commercially available under the trade name ROTAFORM TABLETTER (available from Sandvik).

The granular dye formulations obtained by the process of this invention preferably have the following composition: 30 to 90% by weight of at least one dye, preferably a cationic dye, and optionally 1 to 20% by weight of one or more auxiliaries, dissolved or suspended in a melt of 10 to 60% by weight of polyethylene glycol having a molecular weight of 1000 to 40,000, preferably from 1500 to 20,000, and a melting point in the range from 45° to 55° C. The moisture content of the granular formulations is 1 to 30% by weight.

The granules are permanently non-dusting and have good flow properties. They are also non-hygroscopic, readily soluble in hot water (true solutions are obtained), storage stable (a shelf life of more than 12 months), and have a high bulk density of about 0.7 kg/l, so affording an increased storage and transportation capacity.

The granular dye formulations are used for the preparation of dye baths, padding liquors or printing pastes for dyeing and printing textile material made of natural and/or synthetic fibres, in particular of polyamide.

The invention is illutrated by the following Examples, in which parts and percentages are by weight.

EXAMPLE 1

286 parts of polyethylene glycol (mol. wt. 20,000) are melted by heating to a temperature of 120° C. Then 714 parts of the dye of the formula

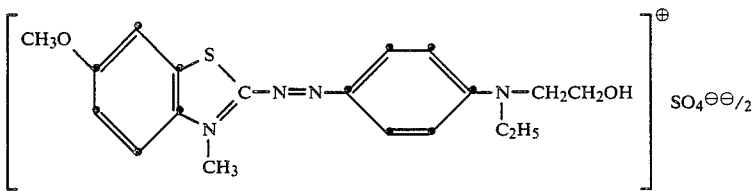

in the form of the filter cake with a water content of 30%, are added to the hot melt. The temperature of the melt is regulated to 80°–90° C. The melt is homogenised and dropped on to a cooling belt from a tabletting machine. At the end of the cooling belt, which has a temperature of about 15° C., the solidified tablets are collected. 1000 parts of dye tablets with a diameter of 5 to 6 mm and a residual moisture content of about 20% are obtained. The tablets are non-dusting and free-flowing and dissolve rapidly in hot water.

A granular formulation with the same good properties is obtained by spraying the melt in a cooling tower.

EXAMPLE 2

836 parts of the dye of the formula

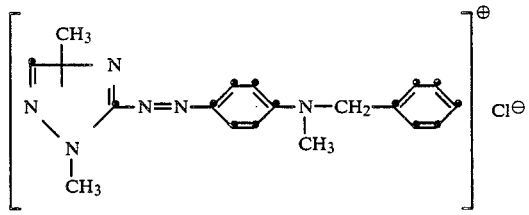

in the form of an 80% oil (remainder water) are heated to 75° C. Then 147 parts of polyethylene glycol (mol. wt. 5000 to 6000) are added to the hot oil and melted. 17 parts of glycerol are added to prevent phase separation. Then a portion of the water is distilled off (optionally under a slight vacuum) and the homogeneous melt is tabletted as described in Example 1. Non-dusting dye tablets with a residual moisture content of about 5% are obtained.

EXAMPLE 3

580 parts of polyethylene glycol (mol. wt. 2000) are melted at 85° C. To the melt are added 420 parts of the dye C.I. Basic Yellow 28, C.I. 48054, with a water content of about 10%. The water content of the dye/polyethylene glycol melt is adjusted to 6% by evaporation. Then the melt is tabletted as described in Example 1, affording non-dusting golden yellow dye tablets with a diameter of 5 to 6 mm.

EXAMPLE 4

580 parts of polyethylene glycol (mol. wt. 2000) are melted by heating to 70° C. To the melt are then added 420 parts of dye. The dye (extended crude dye) has the formula

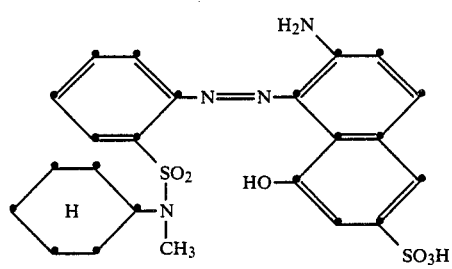

and has a water content of 7%. As described in Example 1, the dye melt is then converted into a solid form. Non-dusting, free-flowing dye tablets with a residual moisture content of 3% are obtained.

EXAMPLE 5

600 parts of polyethylene glycol (mol. wt. 5000 to 6000) are melted by heating to 100° C. To the polyethylene glycol melt are then added 400 parts of the disperse dye of the formula

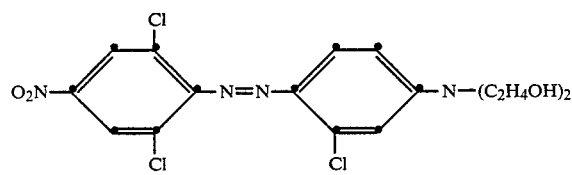

in the form of the moist filter cake with a water content of 40%. The temperature is adjusted to 95° C., the melt is homogenised, and the bulk of the water is distilled off at this temperature. The melt is then dropped on to a cooling belt from a tabletting machine or in the form of a thin layer and allowed to solidify. At the end of the cooling belt, the tablets or the thinly segmented pellets are removed at a temperature of 30° C.

1000 parts of dye tablets or pellets with a residual moisture content of 1 to 3% are obtained. These tablets or pellets are non-dusting, free-flowing, and dissolve rapidly in hot water. A finely particulate dye dispersion which is free from agglomerates is obtained.

EXAMPLE 6

(Dyeing Example)

About 100 parts of water, 3.1 parts of Glauber's salt and 1.2 parts of 60% acetic acid are heated to 80° C. in a dyeing machine. Liquor circulation is then switched on and 0.77 part of the dye tablets prepared in Example 1 are added. These dissolve rapidly in the hot liquor without any deposit. Then 1180 parts of water are run in (liquor ratio: 1:8) and 160 parts of acrylic fabric as tops are put into the dye bath. With constant circulation of the liquor, the bath is heated over 45 minutes to 105° C. and dyeing is carried out for 20 minutes at this temperature. The bath is then cooled, the dyed material is removed from the dyeing machine and subsequently rinsed and dried. A strong blue dyeing of good wetfastness properties is obtained.

What is claimed is:

1. A process for the preparation of a granular dye formulation, which process comprises:
    a. preparing a fluid mixture comprising: (i) melted polyethylene glycol and (ii) a water-containing dye containing at least 5 percent water by weight of the weight of said dye;
    b. preparing granules from the fluid mixture of step (a); and
    c. if necessary, adjusting the water content of the fluid mixture of step (a) prior to preparing the granules of step (b) until the viscosity is sufficient to permit atomization or tabletting of said fluid mixture.

2. A process according to claim 1 wherein said adjusting of water content in step (c) results in a fluid mixture which contains from 1 to 30 percent by weight water.

3. A process according to claim 1 wherein said dye is in the form of the moist filter cake, of the synthesis solution or suspension or of the synthesis melt, or is in the form of an aqueous oil.

4. A process according to claim 1 wherein said dye has a water content of 10 to 90% by weight.

5. A process according to claim 1 wherein said dye has a water content of 10 to 50% by weight.

6. A process according to claim 1, wherein 0.1 to 2 parts of polyethylene glycol are used per 1 part of dye.

7. A process according to claim 1, wherein 0.2 to 1.5 parts of polyethylene glycol are used per 1 part of dye.

8. A process according to claim 1 wherein said polyethylene glycol has a molecular weight of 1000 to 40,000.

9. A process according to claim 1 wherein said polyethylene glycol has a molecular weight of 1500 to 20,000.

10. A granular dye formulation obtained by a process as claimed in claim 1.

11. A process for dyeing or printing textile materials made from natural or synthetic fibers, which comprises the use of a dye bath, padding liquor or printing paste that contains the granular formulation of claim 1.

12. A process according to claim 1 wherein said dye is a cationic dyestuff.

13. A process according to claim 1 wherein the viscosity of said fluid mixture prior to granulation is in the range of from 100 to 5000 mPa's at 80° C.

14. A process according to claim 11 wherein said fiber is polyamide.

15. A granular composition according to claim 10 which comprises:
    a. 30 to 90% by weight of at least one dye;
    b. 10 to 60% by weight polyethylene glycol; and
    c. 1 to 30% by weight water.

16. A granular composition according to claim 15 which further comprises 1 to 20% by weight of at least one auxiliary.

17. A granular composition according to claim 15 wherein said dye is a cationic dye.

* * * * *